Aug. 30, 1955   J. NISENSON   2,716,349
SPEED REDUCING DRIVE
Filed Oct. 30, 1953

United States Patent Office 2,716,349
Patented Aug. 30, 1955

2,716,349
SPEED REDUCING DRIVE
Jules Nisenson, Croton-on-Hudson, N. Y.

Application October 30, 1953, Serial No. 389,241

1 Claim. (Cl. 74—209)

This invention relates generally to the field of gear trains, and more particularly to an improved form of reduction drive in which a very high reduction ratio is obtained while using relatively few pinions and gears.

Gear trains, generally, have been well known in the art for many years. Friction drives have met with a lesser degree of success in application, owing to the reduction in efficiency which is a direct result of the high friction required between meshing gears. When dealing with relatively small sized gears, it is impractical in most cases to attempt a greater degree of reduction between any two gears than five to one. Where reduction of very high ratios, as for example 100 to 1 and more are desired, it has heretofore been necessary to provide a relatively large number of gears in which each step of the reduction was no greater than 5 to 1.

It is therefore among the principal objects of the present invention to provide improved gear train structure in which very high gear reduction ratios may be obtained while employing a relatively small number of pairs of reducing gears and pinions.

Another object of the invention lies in the provision of a gear reduction drive employing toothless gears, in which substantially all slippage has been eliminated, and in which rolling friction is no higher than that obtained when using toothed gears.

Another object of the invention lies in the provision of a gear reducing drive of the class described in which the cost of fabrication may be of a relatively low order, with consequent wide sale, distribution and use.

A further object of the invention lies in the provision of a gear reduction drive employing toothless gears in which there is a complete absence of chatter during operation, owing to novel means for insuring adequate normal reaction between the toothless gears and with a complete absence of binding.

A feature of the invention lies in the provision of resilient means for maintaining certain of the gears of the train of gears in engagement, which means serves to return to engagement any partial or complete momentary disengagement between these gears.

Another feature of the invention lies in the provision of a reduction driving device in which the relative location of certain of the gear pairs may be altered within limits to adapt the device for a variety of applications.

These objects and features, as well as other incidental ends and advantages, will become more clearly apparent during the course of the following disclosure and be pointed out in the appended claim.

On the drawing, to which reference will be made in the specification, similar reference characters have been employed to designate corresponding parts throughout the several views.

Figure 1:
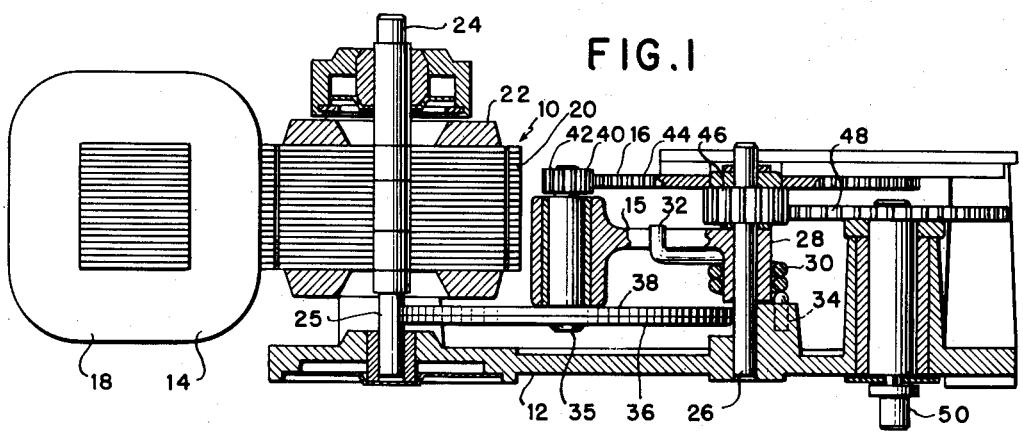
Figure 1 is a sectional view of an embodiment of the invention.

In accordance with the invention, the device, generally indicated by reference character 10, comprises broadly a first or main frame element 12, a prime mover 14, a second frame element 15, and a gear train element 16.

The first frame element 12 may be of any suitable construction, and may, if desired, be part of a device (not shown) upon which the drive is mounted. It includes suitable means for mounting the various shafts upon which the gears and pinions are mounted, but may otherwise be formed from any suitable material in any desired configuration.

The prime mover 14 is preferably in the form of a small electric motor, including a field coil 18, a field magnet 20, and an armature 22. The armature shaft 24 extends outwardly of the armature, and includes an outer cylindrical surface 25, which forms a part of the gear train element 16.

The second frame element 15 is pivotally mounted upon the first frame element 12, to rotate about an axis through a shaft 26, which serves to support the same. A coil spring 30 serves to urge the second frame element 15 in a clockwise direction (as seen on Figure 2), with respect to the first frame element 12, the spring 30 having a first terminal 32, which bears against a portion of the frame element 15, and a second terminal 34 which bears against a portion of the first or main frame element 12.

Figure 2:
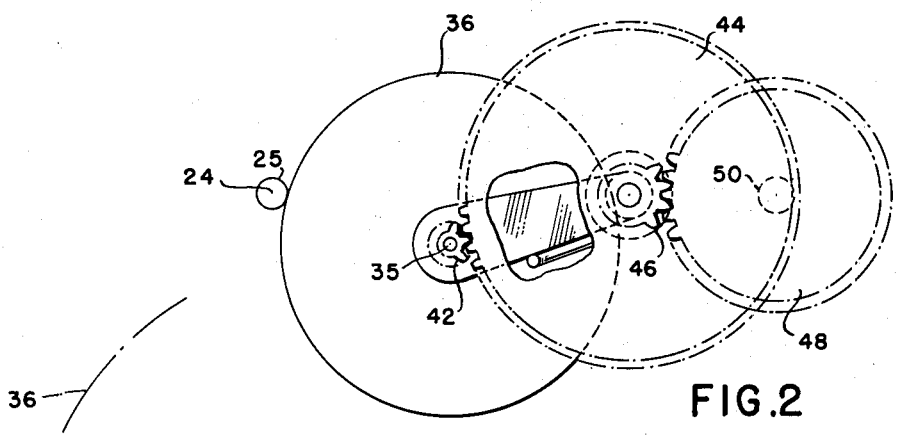
Figure 2 is a schematic view showing the engagement of driving pinions and driven gears which comprise parts of the embodiment.

Mounted upon a shaft 35, which extends into the second frame element 15, is a first reduction gear 36, preferably formed of two parallel lamina 38, the gear 36 being of a toothless type. Referring to Figures 1 and 2 wherein there are shown the respective parts on enlarged scale, it will be noted that the diameter of the shaft 24 is approximately one-tenth that of the gear 36. Owing to the fact that the shaft 24 and the gear 36 are provided with smooth surfaces at points of engagement, it will be readily understood that the shaft 24 may be as little as $\frac{1}{16}$ inch diameter, while the gear 36 may be correspondingly $\frac{5}{8}$ of an inch in diameter. It is thus possible to obtain a 10 to 1 reduction at this stage of the gear train while keeping the mating gears no larger than $\frac{5}{16}$ inch in diameter. The shaft 35 has also mounted thereupon a small pinion 42, at the portion indicated by reference character 40. This pinion is of a toothed type, and meshes with a second gear 44, which may be of a normal reduction ratio, as for example, 5 to 1. The gear 44 is mounted for rotation about the axis of the shaft 26, previously mentioned, the shaft 26 also being provided with a second pinion 46, meshing with a third gear 48, which is mounted upon a power output shaft 50.

Figure 3:
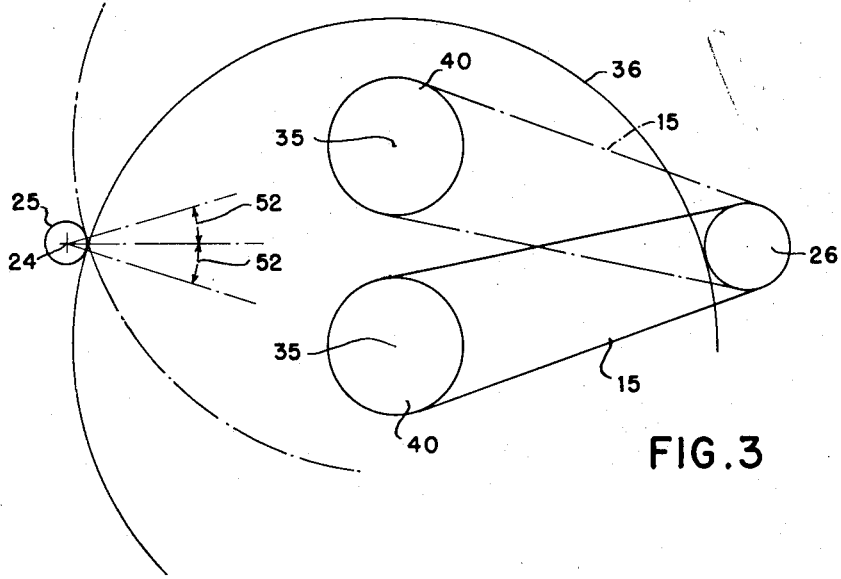
Figure 3 is a schematic view showing the angle of engagement of certain parts with respect to the principal axis of the device.

The gear is normally maintained in contact with the shaft 24 by means of the spring 30 which rotates the second frame element 15 in a counter-clockwise direction, as seen on Figures 2 and 3. Referring to Figure 3, it will be observed that if a plane is passed through the axis of the shaft 24, and the axis of the shaft 26, and a second plane is passed through the axis of the shaft 24, and the axis of the shaft 35, there will be formed an angle indicated by reference character 52. It has been found by experiment that where the angle 52 lies between 4 and 10 degrees, smooth power transmission will occur, there being neither a tendency for the members 24 and 36 to bind or to slip. Where the angle 52 is less than 4 degrees, there has been a marked tendency to bind, and where the angle is greater than 10 degrees, there has been a tendency to slip under load. This value of the tangential angle appears to be correct irrespective of the modulus of the spring 30 or the material from which the gear 36 is formed.

As may be seen on Figures 1 and 2, the device is illustrated such that where the shaft 24 is rotated in a clockwise direction, the output shaft 50 will rotate in a counter-clockwise direction. By disconnecting the spring 30, the second frame element 15 may be rotated in a counterclockwise direction as seen on Figure 3, to the position indicated in the dot dashed line. This is possible due to the fact that the entire frame element 15 is pivotally interconnected with respect to the first or main frame element 12. In the position shown in dot dash lines on Figure 3, a symmetrically shaped spring (not shown), is then engaged to urge the element 15 in a counterclockwise direction as seen on Figures 2 and 3, with respect to the first frame element 12. If the prime mover 14 is then reversed, the rotation of the output shaft 50 will be in a clockwise direction, this provision making it possible to adapt the gear train to the requirements of various installations. It may be observed that the angle indicated by reference character 52 retains the same value irrespective of the location of the frame element 15 with respect to the frame element 12.

Although the shaft 24, for reasons of mechanical strength, is preferably formed from hardened steel, it is possible to form the gear 36 from a variety of materials, as for example, cast or molded nylon, or other suitable synthetic resin, molded fiber, or hardened steel.

It may thus be seen that I have invented novel and highly useful improvements in gear reduction drive devices, in which there is provided simple means for obtaining very high reduction ratios with a minimum number of gears. Owing to the resilient pivotal mounting between the first gear pair, and the narrow angle formed between a plane to the line of contact between the gear pair and a plane passing through the axis of pivotal mounting and the driving gear, a wedge-like action is obtained assuring sufficient normal reaction to prevent slippage between the gear pair. Since the gears are maintained in contact by resilient means, there is no tendency to bind within the specified range of suitable angles, and since the normal reaction is no higher than actually necessary to achieve smooth and continuous driving, the wear on the meshing parts due to rolling friction need be no higher than that encountered when employing toothed gears.

I wish it to be understood that I do not consider the invention limited to the exact details of structure shown and set forth in this specification, for obvious modifications will occur to those skilled in the art to which the present invention pertains.

I claim:

A reduction driving device for use in transmitting rotational motion comprising: a first frame element, a second frame element pivotally mounted with respect to said frame element for rotation about a fixed axis, a driven shaft having a relatively smooth cylindrical surface, and a first driven toothless gear mounted for rotation upon said second frame and frictionally engaging said driven shaft; resilient means engaging said second frame element with respect to said first frame element to urge said toothless gear into operative contact with said driven shaft; said driven gear having a second axis of rotation upon said second frame element which is displaced from said first-mentioned axis; a pinion mounted coaxially with said driven gear, a second driven gear mounted for rotation coaxially with said first-mentioned aixs, said pinion being engaged with said second driven gear; said driven shaft and said first driven gear contacting each other in a plane, said plane forming an angle between 4 and 10 degrees with a plane passing through said first-mentioned axis of rotation, and the axis of rotation of said driven shaft.

References Cited in the file of this patent

UNITED STATES PATENTS

| | | |
|---|---|---|
| 2,036,247 | Winther | Apr. 7, 1936 |
| 2,259,591 | Sperry | Oct. 21, 1941 |
| 2,376,524 | Talboys et al. | May 22, 1945 |